US006505165B1

(12) United States Patent
Berstis et al.

(10) Patent No.: US 6,505,165 B1
(45) Date of Patent: Jan. 7, 2003

(54) METHOD AND APPARATUS FOR LOCATING FACILITIES THROUGH AN AUTOMOTIVE COMPUTING SYSTEM

(75) Inventors: Viktors Berstis, Austin, TX (US); Linda Arnold Lisle, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,331

(22) Filed: Jan. 28, 1999

(51) Int. Cl.[7] .............................................. G06F 17/60
(52) U.S. Cl. .............................. 705/1; 705/43; 701/25; 701/26; 701/208; 701/209; 701/213; 340/990; 340/995
(58) Field of Search ........................ 705/1, 6, 26, 43; 701/23, 25, 26, 200, 201, 202, 208, 209, 211, 213; 340/988, 990, 995, 996

(56) References Cited

U.S. PATENT DOCUMENTS

| | | | | |
|---|---|---|---|---|
| 5,559,520 A | * | 9/1996 | Barzegar et al. | 701/213 |
| 5,893,113 A | * | 4/1999 | McGrath et al. | 701/23 |
| 5,910,782 A | * | 6/1999 | Schmitt et al. | 340/995 |
| 6,009,403 A | * | 12/1999 | Sato | 705/6 |
| 6,014,090 A | * | 1/2000 | Rosen et al. | 340/995 |
| 6,021,371 A | * | 2/2000 | Fultz | 701/200 |
| 6,047,234 A | * | 4/2000 | Cherveny et al. | 701/200 |
| 6,047,236 A | * | 4/2000 | Hancock et al. | 701/208 |
| 6,073,075 A | * | 6/2000 | Kondou et al. | 701/201 |
| 6,088,636 A | * | 7/2000 | Chigumira et al. | 701/26 |
| 6,094,618 A | * | 7/2000 | Harada | 701/208 |
| 6,148,261 A | * | 11/2000 | Obradovich et al. | 701/208 |
| 6,185,501 B1 | * | 2/2001 | Smith et al. | 701/200 |
| 6,199,045 B1 | * | 3/2001 | Giniger et al. | 705/1 |
| 6,202,022 B1 | * | 3/2001 | Ando | 701/200 |
| 6,208,934 B1 | * | 3/2001 | Bechtolsheim et al. | 701/23 |
| 6,249,767 B1 | * | 6/2001 | Okayama et al. | 705/6 |
| 6,256,578 B1 | * | 7/2001 | Ito | 701/200 |

FOREIGN PATENT DOCUMENTS

| | | | |
|---|---|---|---|
| WO | WO 98/08314 | * | 2/1998 |
| WO | WO 99/20489 | * | 4/1999 |

OTHER PUBLICATIONS

Anonymous, "For a Few Lucky Motorists, Guidance by Satellite", New York Times, Abstract, vol. 143, No. 49, Apr. 2, 1994.*
Anonymous, "Bell Atlantic Intros Cellular InfoAssist", Newsbytes News Network, Dialog File 9:Business & Industry, Sep. 6, 19994.*
Anonymous, "Avis Expands Availability of Satellite Navigation Cars to Metro–New York Area", Press Release, Dialog File 813:PR Newswire, Jul. 10, 1995.*
Dellecave, Tom Jr., "Lost in New York", Sales & Marketing Management, vol. 148, No. 5, pp. 98–103, May 1996.*
Johnson, Colin R., "GPS is the Car Sextant of Late '90s", Electronic Engineering Times, No. 947, p. 130, Mar. 31, 1997.*
Anonymous, "Carriers Steadily Working on Enhanced '911 Compliance", Mobile Phone News, vol. 15, No. 14, Apr. 7, 1997.*

* cited by examiner

Primary Examiner—James P. Trammell
Assistant Examiner—John W. Hayes
(74) Attorney, Agent, or Firm—Duke W. Yee; Jeffrey S. LaBaw (57) ABSTRACT

A method and apparatus in a distributed data processing system for locating a facility from a plurality of facilities. Data is collected from the plurality of facilities. The collected data is compared with current data regarding the facilities. Changes present between the collected data and the current data are identified. The current data is updated using the changes. Responsive to a request from a mobile computing system for a location of a facility, a response is sent to the mobile computing system based on the current data and the request.

24 Claims, 5 Drawing Sheets

METHOD AND APPARATUS FOR LOCATING FACILITIES THROUGH AN AUTOMOTIVE COMPUTING SYSTEM

BACKGROUND OF THE INVENTION

1. Technical Field

The present invention relates generally to an improved data processing system and in particular to an improved method and apparatus for collecting data in a distributed data processing system. Still more particularly, the present invention relates to a method and apparatus for locating facilities using a distributed automotive computing system.

2. Description of Related Art

The use of computers has become more and more pervasive in society. This pervasiveness includes the integration of personal computers into vehicles. The utilization of computer technology is employed to provide users or drivers with a familiar environment. In this manner, a user's ability to easily use computing resources in an automobile is provided. In addition, it is envisioned that car buyers would be able to use most of the same software elements in an automobile that are used at home or in the office. Furthermore, an automobile owner could completely customize driver information displays to create an optimal environment for the driver's needs. Various platforms have been developed and are being developed for use in automobiles. Many platforms provide the computing strength of a personal computer platform with widely recognized as well as emerging technologies.

Widely accepted technologies that may be implemented within an automobile include, cellular/global system for mobile communications (GSM), global positioning system (GPS), and radio data broadcast (RDB). These devices allow a driver to navigate, receive real-time traffic information and weather forecasts, access databases of personalized information, and place and receive telephone calls, as well as send and receive email and faxes from an automobile. Emerging technologies that are being integrated into computing platforms for automobiles include the universal serial bus (USB) and the digital video disk (DVD).

Another key feature for adapting computer technologies for use in an automobile is a voice recognition interface (VRI) for the driver along with a more conventional graphical user interface (GUI) for passengers. Voice recognition technology is already well developed in multi-media desktop personal computers. For example, VoiceType family products available from International Business Machines Corporation may be also used in the automobile. Voice recognition technology would allow drivers to easily control and interact with onboard computers and telephone applications, including productivity software, internet browsers, and other applications while allowing the driver to keep their hands on the wheel and their eyes on the road. Such productivity is especially important when some surveys show that up to twelve percent of a person's waking life is spent in an automobile.

Computing systems are currently being developed for automobiles to guide drivers from various points using GPS data, traffic data, weather data, and other information. In addition, computing systems for automobiles are being developed in which maps containing locations of various facilities, such as automatic teller machines (ATMs), restaurants, hotels, points of interest, and other facilities. These systems are being developed such that the driver may locate these facilities and directions to the facilities from within the automobile through an automotive computing platform. In locating a facility, such as an ATM, often ATMs do not accept a particular set of ATM cards and sometimes various ATMs are down or inoperative. In such an instance, a driver may become frustrated with an inability to locate an ATM from which the driver may withdraw cash.

Therefore, it would be advantageous to have an improved method and apparatus for locating facilities through an automotive computing platform.

SUMMARY OF THE INVENTION

The present invention provides a method in a distributed data processing system for locating a facility from a plurality of facilities. Data is collected from the plurality of facilities. The collected data is compared with current data regarding the facilities. Changes present between the collected data and the current data are identified. The current data is updated using the changes. Responsive to a request from a mobile computing system for a location of a facility, a response is sent to the mobile computing system based on the current data and the request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
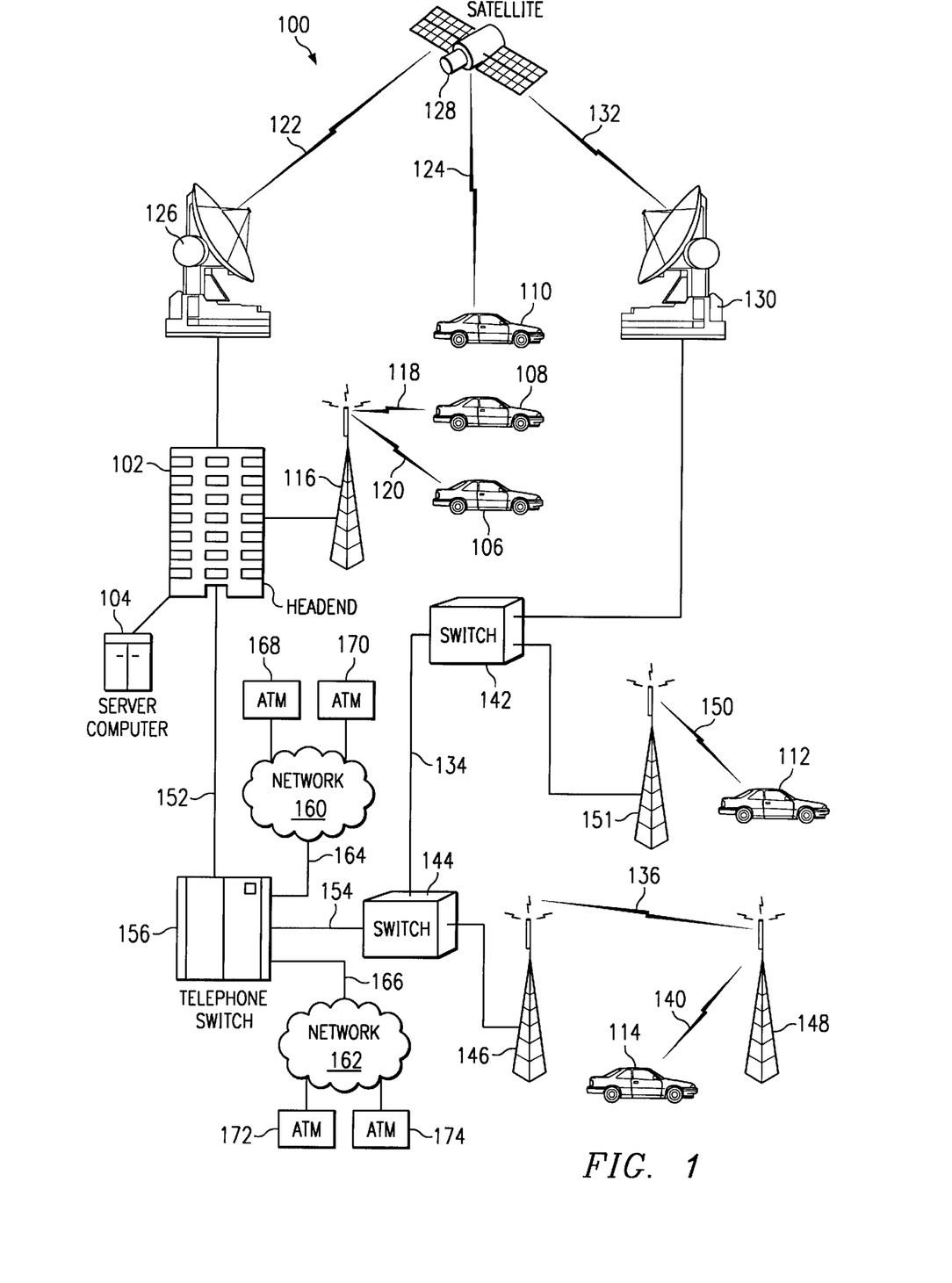
FIG. 1 is a diagram of a computing system in accordance with a preferred embodiment of the present invention.

With reference now to the figures and in particular with reference to FIG. 1, a diagram of a computing system 100 is depicted in accordance with a preferred embodiment of the present invention. In this example, head-end 102 is connected to a server computer 104, which is employed to collect data from various automotive computing platforms that may be present within computing system 100. In particular, server computer 104 may communicate with various mobile units 106–114, which are automobiles in the depicted example. These automobiles each contain a computing platform, which may communicate with server 104. In this example, communications between various mobile units may be accomplished through a cellular phone system or through an iridium satellite phone system or other wireless systems.

Communication between server computer 104 and mobile units 106–114 is accomplished in a number of different ways in this example. For example, radio tower 116 provides communications links 118 and 120 to mobile units 108 and 106 respectively. Communications links 118 and 120 are radio frequency communications links generated between radio tower 116 and antennas located at mobile units 106 and 108. In addition, server 104 may communicate with mobile unit 110 through communications links 122 and 124. Communications link 122 is established between satellite dish 126 and satellite switch 128 with communications link 124 being established between satellite 128 and mobile unit 110. Communications links 122 and 124 are radio frequency based links generated by signals sent to satellite switch 128 from satellite dish 126 and from satellite switch 128 to mobile unit 110. In this example, radio tower 116 and satellite dish 126 are connected to head-end 102 and provide for transmissions originating from or passing through head-end 102.

Further, signals may be sent from satellite switch 128 to satellite dish 130 via communications link 132. From satellite dish 130, information may be sent to mobile unit 114 through communications links 134, 136, and 140. Communications link 134 in this example is a link between switch 142 and switch 144. In this manner, a path may be established from server computer 104 to mobile unit 114 to create a path containing communications links 122, 132, 134, 136, and 140. Communications link 134 is a physical link, which may be for example, coaxial cable, fiber optic cable, or a combination of the two. Each switch also has a "link", also called a "path" within the switch for writing data through the switch. An "input link" is the input or source portion of the link associated with the input into the switch, and an "output link" is the output or destination portion of the link associated with the output from the switch. Communications link 136 is established between radio towers 146 and 148. Radio tower 146 is connected to switch 144 in FIG. 1. Communications link 140 is established between radio tower 148 and mobile unit 114. Communications with mobile unit 112 may be established through a path containing communications links 122, 132, and 150. Communications link 150 is established between radio tower 151 and mobile unit 112. In this example, satellite dish 130 and radio tower 151 are connected to switch 142.

In addition, server computer 104 may use an alternate path to communicate with mobile unit 114. For example, a path through communications links 152, 154, 136, and 140 may be employed to communicate with mobile unit 114. Links 152 and 154 are physical links in this example. Communications link 152 is established between head-end 102 and switch 156, while communications link 154 is established between switch 156 and switch 144. In this manner, data signals, such as multi-media data, which may include video, graphics, voice, and text may be sent between server computer 104 and mobile units 106–114. These data signals may also include information about traffic conditions, such as the amount of traffic, weather, accidents, construction, and other conditions affecting the movement of traffic.

In addition, computing system 100 also includes networks 160 and 162, which are in communication with server computer 104. Network 160 has a communications path to server computer 104 via communications links 164 and 152. Network 162 communicates with server computer 104 through communications links 166 and 152. Various facilities may be within networks 160 and 162. For example, in FIG. 1, automatic teller machines (ATMs) 168 and 170 are located within network 160, while ATMs 172 and 174 are located within network 162. Of course, other facilities may be located within networks 160 or 162. Information is obtained from ATMs 168–174 and sent to server computer 104. This information may include an indication of whether cash is present within an ATM, what cards are currently being accepted by the ATM, and whether the ATM is operating. Server 104 may poll networks 160 and 162 to obtain this information or the information may be pushed to server 104 from the networks. An arrangement with various banks owning the ATM machines may be present to allow for a query of ATMs on a regular basis to determine whether a given ATM is operating correctly and contains cash. With other facilities, other information may be polled for depending on the criteria for the particular facility.

Figure 2:
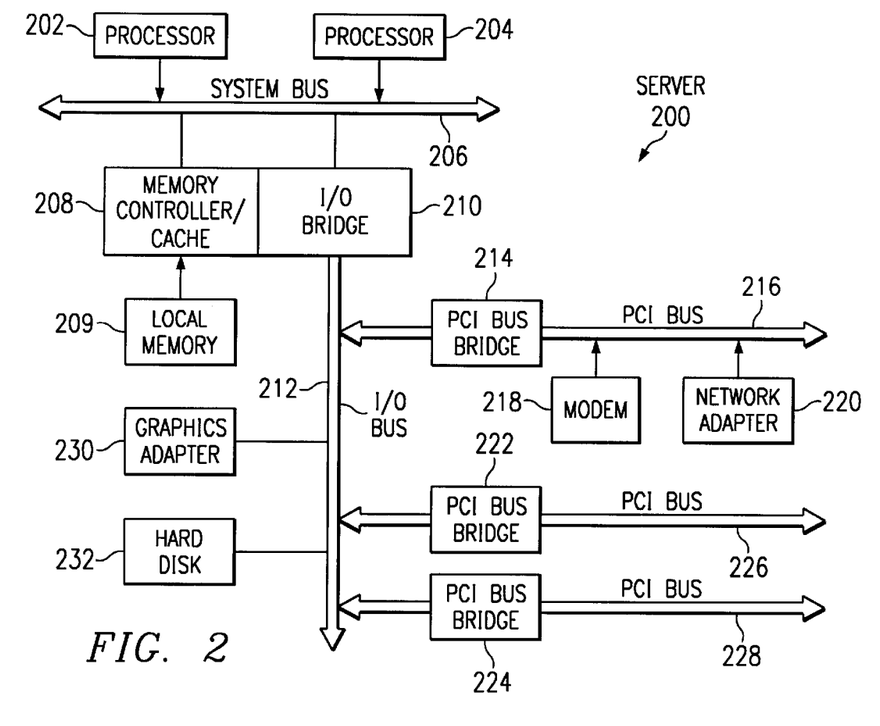
FIG. 2 is a block diagram of a data processing system, which may be implemented as a server, in accordance with a preferred embodiment of the present invention.

Referring to FIG. 2, a block diagram depicts a data processing system, which may be implemented as a server, such as server computer 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to various mobile units illustrated in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as an optical disk drive and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
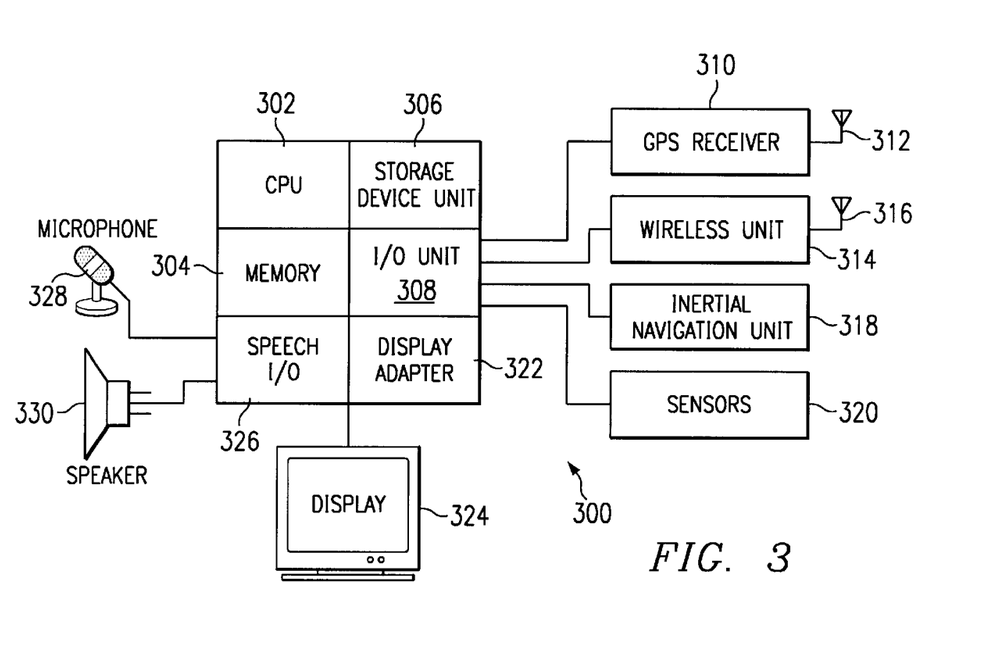
FIG. 3 is a block diagram of an automotive computing platform in accordance with a preferred embodiment of the present invention.

Turning next to FIG. 3, a block diagram of an automotive computing platform is depicted in accordance with a preferred embodiment of the present invention. Computing platform 300 is located within a vehicle, such as an automobile or truck. Computing platform 300 includes a CPU 302, which may be an embedded processor or processor such as a Pentium processor from Intel Corporation. "Pentium" is a trademark of Intel Corporation. Computing platform 300 also includes memory 304, which may take the form of random access memory (RAM) and/or read only memory (ROM).

Computing platform 300 also contains a storage device unit 306. Storage device unit 306 may contain one or more storage devices, such as, for example, a hard disk drive, a flash memory, a DVD drive, or a floppy disk. Automotive computing platform 300 also includes an input/output (I/O) unit 308, which provides connections to various I/O devices. In this example, a GPS receiver 310 is included within automotive computing system 300 and receives signals through antenna 312. Wireless unit 314 provides for two-way communications between computing unit 300 and another data processing system, such as server 104 in FIG. 1. Communications are provided through antenna 316. In addition, inertial navigation unit 318 is connected to I/O unit 308. Inertial navigation unit 318 is employed for navigation when GPS receiver 310 is unable to receive a usable signal or is inoperable.

A multitude of different sensors 320 also are connected to I/O unit 308. These sensors may include, sensors that detect speed, unusually high acceleration forces, airbag deployment, extensive speed up and slow down cycles, dropping out of cruise control, brake use, anti-lock brake occurrences, traction control use, windshield wiper use, turning on or off of lights for the automobile, and outside light levels. In addition, sensors 320 may include sensors for detecting steering wheel movement, temperature, the state of door locks, and the state of windows. In other words, almost any condition or parameter about or around an automobile may be detected through the use of sensors 320.

Computing unit 300 also includes a display adapter 322, which is connected to display 324. In the depicted example, this display is a touch screen display. Alternatively or in addition to a touch screen display, display 324 also may employ a heads-up display projected onto the windshield of the automobile. Computing unit 300 also includes a microphone 328 and a speaker 330 to provide a driver with an ability to enter commands and receive responses through speech I/O 326 without having to divert the driver's attention away from the road, or without the driver having to remove the driver's hands from the steering wheel.

A driver may log in to computing platform 300 such that various preferences for a particular driver may be retrieved. The log in may be achieved through a number of different mechanisms. For example, a driver may log in through recognition of a particular driver's voice or through entering a password and ID. This preference information is stored in storage device unit 306 in the depicted example. Additional preferences may be transmitted to a server, such as server 104 in FIG. 1 to aid in processing requests from a particular driver.

Figure 4:
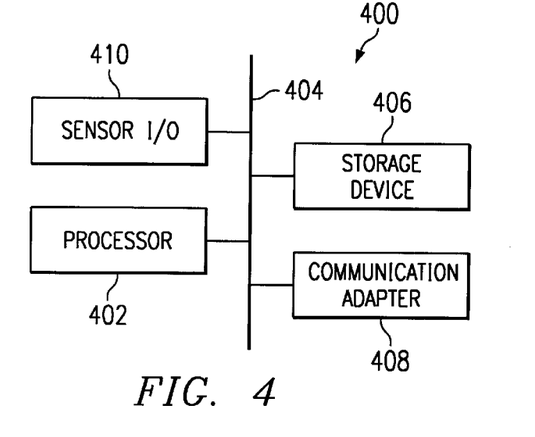
FIG. 4 is a block diagram of a data processing system within a facility in accordance with the preferred embodiments of the present invention.

With reference now to FIG. 4, a block diagram of a data processing system within a facility is depicted in accordance with a preferred embodiment of the present invention. Data processing system 400 is an example of a data processing system that may be used within a facility, such as an ATM. In this example, processor 402 is connected to bus 404 and includes storage device 406, which may be used to contain various information.

For an ATM, storage device 406 may identify the amount of cash available and various cards accepted by the ATM machine. Communications adapter 408 is used to receive and send information between the facility and another entity. In the case of an ATM machine, communications adapter 408 may provide communication between the ATM and the data processing system for the bank owning the ATM. Sensor I/O 410 may be used to identify various changes with respect to the facility. For example, with an ATM, sensor I/O 410 may be used to identify the withdrawal of cash and to identify ATM cards being inserted within the ATM machine.

The diagram in FIG. 4 is not meant to indicate any architectural limitations on a data processing system that may be used within a facility. Depending on the implementation, a data processing system used within a facility may include fewer or additional components than those shown in FIG. 4. In addition, although data processing system 400 has been explained in the context of an ATM machine, such a data processing system may be used with respect to other facilities.

For example, if the facility of interest is a hotel, data processing system 400 may be a terminal or computer located at the hotel in which the terminal or computer communicates with a network belonging to the company owning the hotel. In such a case, sensor I/O 410 may not be necessary and a keyboard for input would be used to identify persons checking in and out, and room availability.

The present invention provides a method, apparatus, and instructions for locating facilities taking into account dynamic changes in the status of various facilities. In this example, status information is received from various facilities or collected at a central database or at a number of different databases. This central database may be located at a computer, such as server 104 in computing system 100 in FIG. 1. The collected information is used to respond to various requests from drivers in mobile units, such as automobiles and trucks, for the location of a facility. In addition, driver information may be stored at server 104 to identify various parameters for locating facilities. For example, with respect to facilities in the form of ATMs, the card used by the driver may be stored in a database at server 104. In this manner, when a driver requests the location of an ATM, the server may identify ATMs accepting the driver's card (i.e. ATM card or credit card). Additional preferences also may be stored. For example, if the driver desires to locate a gas station, the preferred type of gas may be stored in a file associated with the driver. In this manner, when the driver requests the location of a gasoline station, the closest gasoline station meeting the driver's preference may be located.

The present invention may be especially useful in providing users locations of various facilities, such as automatic teller machines (ATMs), gas stations, hotels, and restaurants. Most mapping information is typically stored locally in the automobile on a CD, DVD, or other storage media. The computing platform may connect to a server computer to obtain updated information on current conditions and availability of various facilities in the different areas in response to a driver's request to locate a facility. This information may be used to route the driver to the closest facility desired by the driver. When requesting a facility, such as an ATM, the computing platform may automatically connect via a suitable wireless connection to a server computer, such as server computer 104 in FIG. 1 and obtain the closest facility to the driver.

With reference now to FIGS. 5A–5D, diagrams of displays of menus used to locate facilities are depicted in accordance with a preferred embodiment of the present invention. In this example, the displays illustrated in FIGS. 5A–5D are those that may be displayed on display 324 in computing platform 300 in FIG. 3.

Figure 5A:
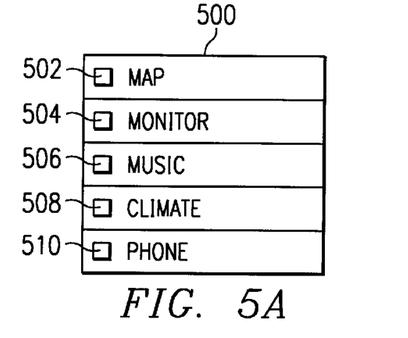
FIGS. 5A–5D are diagrams of displays of menus used to locate facilities in accordance with the preferred embodiments of the present invention.
Figure 5B:
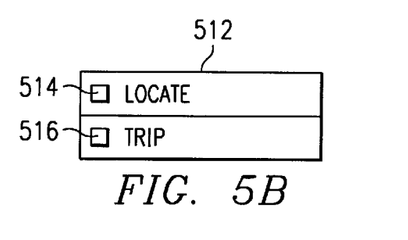

In FIG. 5A, display 500 includes a map button 502, a monitor button 504, a music button 506, a climate button 508, and a phone button 510. These buttons may be selected by the user to activate various functions within the computing platform. In the depicted example, these buttons may be selected by touching the appropriate button on display 500. Alternatively, voice recognition software may be used to recognize commands for the various selections. In this example, selection of monitor button 504 provides a display of various systems within the automobile that the user may view to obtain status information, such as temperature, oil levels, whether doors are open, and failed devices. Music button 506 allows a user to manipulate the stereo system of the car. Climate button 508 allows the user to adjust various climate controls. Phone button 510 allows the user to initiate a call via the display. Selection of map button 502 results in display. 512 in FIG. 5B being displayed to the user. Display 512 includes locate button 514 and trip button 516. Selection of trip button 516 allows the user to map and obtain directions for various trips by selecting an origination point and a destination point. Selection of locate button 512 results in display 518 in Figure 5C being displayed to the user. This display includes various selections, such as ATM button 520, gas station button 522, restaurant button 524, auto repair button 526, and other button 528.

Figure 5C:
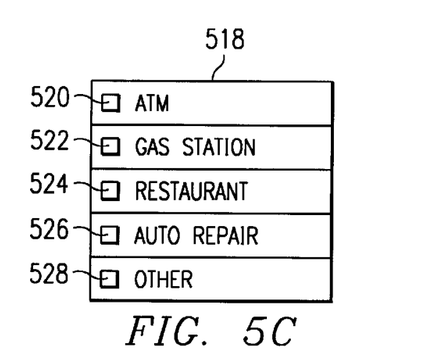

Selection of gas station button 522 would result in the system querying for the closest gasoline station to the present location of the driver of the vehicle. In addition, the query would be made by obtaining data from a server, such as server computer 104 in FIG. 1, to obtain current information as to what gasoline stations are currently open or closed. Further, a driver may obtain information as to whether a gas station currently has the type of gas that the user prefers to use with the automobile. For example, one driver may only desire to place premium gasoline in the automobile. As a result, such a preference would result in gasoline stations being located that presently have this grade of gasoline available. In addition, a user may prefer to locate a gas station from one company because the user has a credit card with that company.

Selection of restaurant button 524 allows a user to locate various restaurants. Through the selection of this button, the user may locate restaurants of various types and price ranges. In addition, the user may locate restaurants that are open or have seating availability. Similar information may be obtained by selecting auto repair button 526. If other button 528 is selected, the driver may select another facility by inputting the name of the facility. Additionally, a user may identify grocery stores or convenient stores that are close by or that have certain goods or items available for purchase.

Figure 5D:
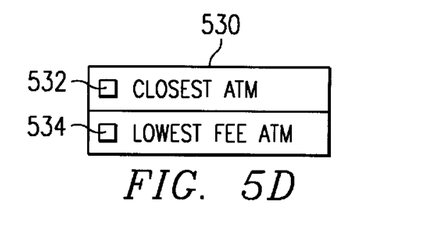

Selection of ATM button 520 results in display 530 in FIG. 5D being displayed to the user. Closest ATM button 532 and lowest fee ATM button 534 are selections available in display 530. Selection of closest ATM button 532 results in the closest ATM being located. As part of this identification, the automotive computing platform may query server 104 in FIG. 1 to identify ATMs that are currently operable and have cash available. In addition, based on the ATM card owned by the user, this parameter also is used to identify the closest ATM to the driver. Upon identifying the closest ATM meeting these parameters, the location of the ATM is presented to the driver. Similarly, selection of lowest fee ATM button 534 results in a search for the closest ATM with the lowest fee for the driver. This query would be made in a similar fashion to that for just the closest ATM. The automotive computing platform would send a query to a server, such as server 104 in FIG. 1, to identify the closest ATM with the lowest fee. In addition, parameters, such as operability of the ATM, availability of cash, and acceptance of the driver's ATM card, are used to locate the closest ATM. Upon locating the closest ATM meeting these parameters, this location is presented to the user.

Figure 6:
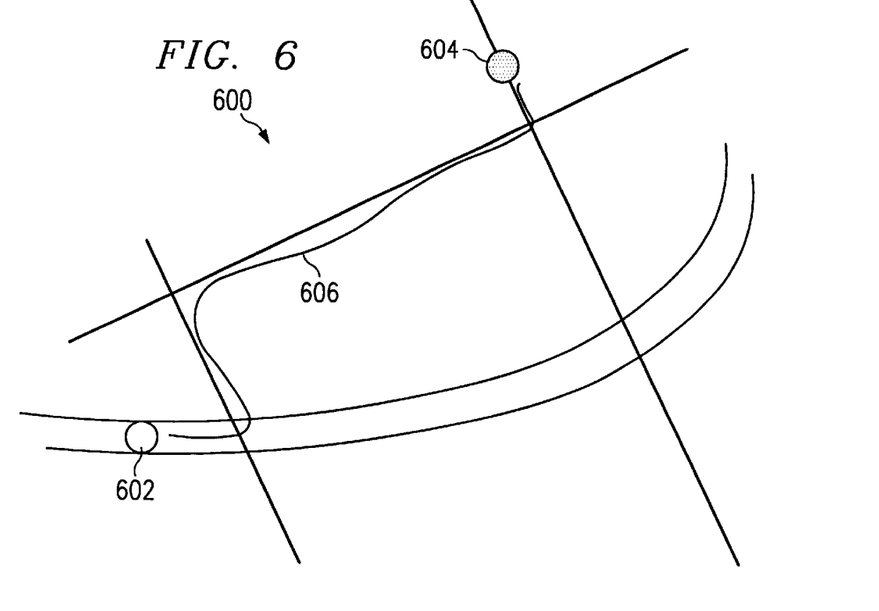
FIG. 6 is a diagram of a map displayed on a display device, in accordance with a preferred embodiment of the present invention.

With reference now to FIG. 6, a diagram of a map displayed on a display device, such as display 324 in computing platform 300 in FIG. 3, is depicted in accordance with a preferred embodiment of the present invention.

Map 600 is displayed to the driver in response to locating a facility selected by the driver. In this example, the driver has made a query to locate the closest ATM. Upon locating the closest ATM, the driver's current location is identified through GPS receiver 310 in FIG. 3 at point 602. The location of the ATM meeting the driver's criteria is located at point 604. Route 606 is calculated and displayed to the user on map 600 so that the user may drive to the ATM at point 604. In addition, although not shown, textual directions also may be presented to the user. Alternatively, voice directions may be provided to the user in addition to the display of map 600.

Figure 7:
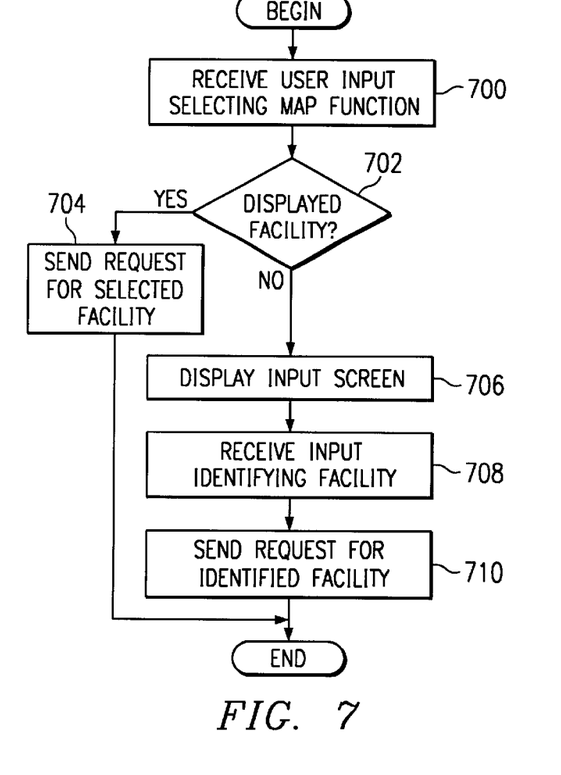
FIG. 7 is a flowchart of a process used in a computing platform located in an automobile in accordance with a preferred embodiment of the present invention.

With reference now to FIG. 7, a flowchart of a process used in a computing platform located in an automobile is depicted in accordance with a preferred embodiment of the present invention. The process in FIG. 7 is used to locate a facility. The process begins by receiving user input selecting a map function (step 700). Thereafter, a determination is made as to whether the input is for a displayed facility (step 702). If the selection is for a displayed facility, then the request for the selected facility is sent from the automotive computing platform to a server computer (step 704) with the process terminating thereafter.

If, on the other hand, the user has not selected a display facility, the user has selected another selection resulting in a display being displayed to the user to input the facility the user desires to locate (step 706). This display is used when the displayed screen providing selections of facilities does not show the one desired by the user. Thereafter, input is received identifying the facility (step 708) and the request for the identified facility is then sent to the server computer (step 710), with the process terminating thereafter.

Figure 8:
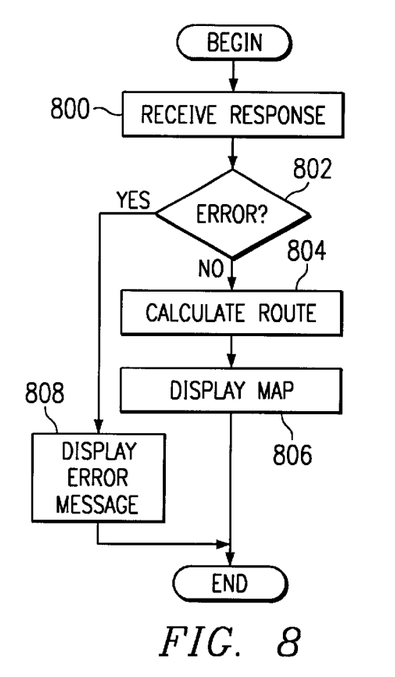
FIG. 8 is a flowchart of a process employed within a computing system to present a located facility in accordance with a preferred embodiment of the present invention.

Referring now to FIG. 8, a flowchart of a process employed within a computing system to present a located facility is depicted in accordance with a preferred embodiment of the present invention. The process begins by receiving a response from the server computer (step 800). A determination is made as to whether the response is an error (step 802). If an error has not occurred, then the path is calculated from the driver's current location to the location of the facility returned (step 804). Then a map is displayed with the path or route (step 806) with the process terminating thereafter. With reference again to step 802, if an error has occurred, then an error message is displayed to the user (step 808) with the process terminating thereafter.

In this example, a location of the facility is returned to the automotive computing platform, and the automotive computing platform uses this location along with the location of the driver's current location obtained from the GPS receiver to calculate the route and prepare the display of the map to the driver. In some instances, depending on the implementation, the server computer may make these calculations and calculate the route based on the located facility and the location of the driver.

Figure 9:
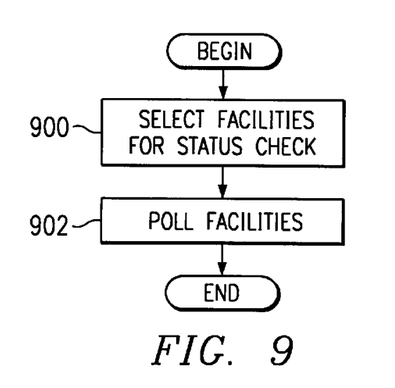
FIG. 9 is a flowchart of a process used by a server computer to collect information on facilities in accordance with a preferred embodiment of the present invention.

With reference now to FIG. 9, a flowchart of a process used by a server computer to collect information on facilities is depicted in accordance with a preferred embodiment of the present invention. The process begins by selecting the facilities for status check (step 900). Thereafter, the selected facilities are polled (step 902) with the process terminating thereafter. The polling may be accomplished by the server computer sending a request to each facility selected or to another computer collecting information on the status of the facilities.

Figure 10:
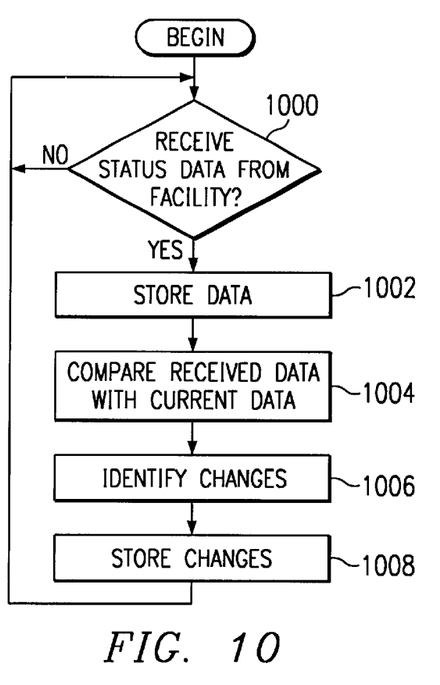
FIG. 10 is a flowchart of a process for processing status information from various facilities in accordance with a preferred embodiment of the present invention.

With reference next to FIG. 10, a flowchart of a process for processing status information from various facilities is depicted in accordance with a preferred embodiment of the present invention. This information is typically received in response to polling of facilities as described with reference to FIG. 9. The process determines whether status data or information has been received from the facility (step 1000). If status information has not been received from a facility, the process returns to step 1000. Upon receiving status information or data from a facility, this information is stored (step 1002). Thereafter, the information received from the facility is compared with current data regarding the facility (step 1004). Any changes between the received data and the current data are identified (step 1006). These changes are stored to update the current data (step 1008), with the process then returning to step 1000 to monitor for additional data from facilities.

Figure 11:
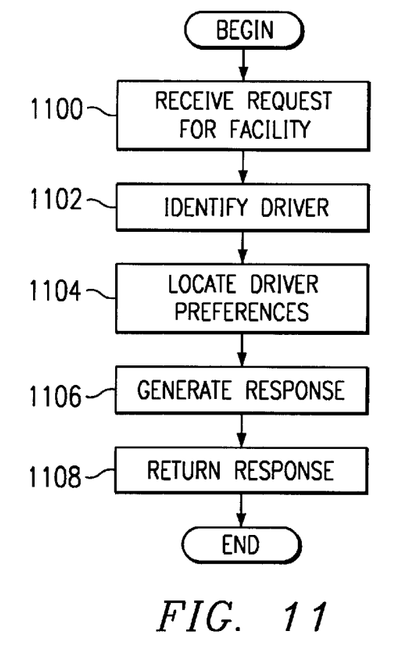
FIG. 11 is a flowchart of a process for processing a request to locate a facility in accordance with a preferred embodiment of the present invention.

With reference now to FIG. 11, a flowchart of a process for processing a request to locate a facility is depicted in accordance with a preferred embodiment of the present invention. This process is typically implemented in a server, such as server computer 104 in FIG. 1. The process begins by receiving a request for a facility (step 1100). Next, the driver is identified from a request (step 1102). Thereafter preferences for the driver are located based on the identification of the driver (step 1104). A response to the request for the facility is generated (step 1106). This response is then returned (step 1108) with the process terminating thereafter. The response may be in the form of an error message or a location of the requested facility.

Figure 12:
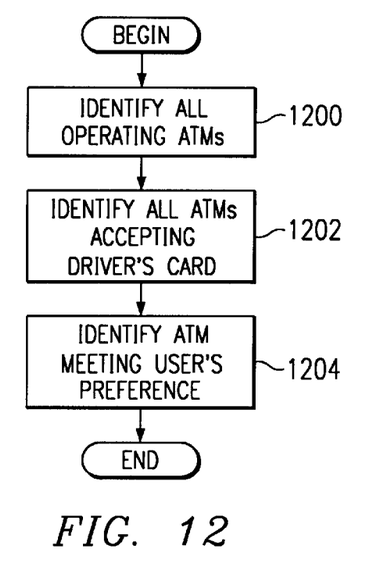
FIG. 12 is a flowchart of a process for generating a response in accordance with a preferred embodiment of the present invention.

With reference now to FIG. 12, a flowchart of a process for generating a response is depicted in accordance with a preferred embodiment of the present invention. This flowchart is a more detailed flowchart of step 1106 in FIG. 11 for a particular facility. In this example, the facility being located is an ATM machine. The process begins by identifying all operating ATMs (step 1200). Thereafter, all ATMs accepting the driver's card are identified (step 1202). Then, the ATM meeting the driver's preferences is identified (step 1204) with the process terminating thereafter. This preference may be based on preferences, such as the closest location or the lowest fee. Although the depicted examples have illustrated the presentation of a location of a single facility to a driver in response to a request for the location of a facility, multiple facilities meeting the driver's preferences may be returned to the driver and presented as a number of selections that the driver may select from.

For example, with respect to ATMs, the two closest ATMs may be presented to the user on a map or as a selection. Alternatively, the closest two ATMs may be presented to the user, with the closest ATM being identified as one having a higher fee than the one that is slightly farther away. The driver may be presented with a selection to identify which ATM the driver would like to use. In response to this selection, a map of the route can then be presented to the driver. Of course, the process of the present invention may be applied to locating any facility that a driver may wish to locate.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for locating a facility from a plurality of facilities, the method comprising the computer implemented steps of:

receiving data from the plurality of facilities in which the plurality of facilities is a plurality of automatic teller machines, wherein the data is collected data and wherein the collected data includes an availability of cash at each of the plurality of automatic teller machines;

comparing the collected data with current data regarding facilities;

identifying changes present between the collected data and the current data;

updating the current data using the changes; and responsive to a request from a mobile computing system for a location of a facility, sending a response to the mobile computing system based on current data and the request.

2. The method of claim 1, wherein the step of receiving data includes receiving status information from each of the plurality of automatic teller machines.

3. The method of claim 1, wherein the step of sending a response comprises:

identifying the driver originating the request;

responsive to identifying the driver, obtaining driver preferences regarding automatic teller machine for the driver; and identifying a automatic teller machine from the plurality of automatic teller machines using the driver preferences and the current data.

4. The method of claim 1, wherein the mobile computing system is located in an automobile.

5. The method of claim 1, wherein the current data is stored in a storage device.

6. A method in a distributed data processing system for locating a facility from a plurality of facilities, the method comprising the computer implemented steps of:

receiving data from the plurality of facilities in which the plurality of facilities is a plurality of automatic teller machines, wherein the data is collected data and wherein the collected data includes an indication of whether an automatic teller machine within the plurality of automatic teller machines is operational;

comparing the collected data with current data regarding facilities;

identifying changes present between the collected data and the current data;

updating the current data using the changes; and responsive to a request from a mobile computing system for a location of a facility, sending a response to the mobile computing system based on current data and the request.

7. The method of claim 6, wherein the step of receiving data includes receiving status information from each of the plurality of automatic teller machines.

8. The method of claim 6, wherein the step of sending a response comprises:

identifying the driver originating the request;

responsive to identifying the driver, obtaining driver preferences regarding automatic teller machine for the driver; and     identifying a automatic teller machine from the plurality of automatic teller machines using the driver preferences and the current data.

9. The method of claim 6, wherein the mobile computing system is located in an automobile.

10. The method of claim 6, wherein the current data is stored in a storage device.

11. The data processing system for locating an automatic teller machine from a plurality of automatic teller machines, the data processing system comprising:

receiving means for collecting data from the plurality of automatic teller machines in which the data is collected data and wherein the collected data includes an availability of cash at each of the plurality of automatic teller machines;

comprising means for comparing the collected data with current data regarding the plurality of automatic teller machines;

identifying means for identifying changes present between the collected data and the current data;

updating means for updating the current data using the changes; and     sending means, reponsive to a request from a mobile computing system for a lacation of a automatic teller machine, for sending a response to the mobile computing system based on the current data and the request.

12. The data processing system of claim 11, wherein receiving data includes receiving status information from each of the plurality of automatic teller machines.

13. The data processing system of claim 11, wherein sending a response comprises;

first identifying means for identifying the driver originating the request;

obtaining means, responsive to identifying the driver, for obtaining driver preference regarding automatic teller machine for the driver; and     second identifying means for identifying a automatic teller machine from the plurality of automatic teller machines using the driver preferences and the current data.

14. The data processing system of claim 11, wherein the mobile computing system is located in an automobile.

15. The data processing system of claim 11, wherein the current data is stored in a storage device.

16. A data processing system for locating a facility from a plurality of facilities, the data processing system comprising:

receiving means for collecting data from the plurality of facilities in which the data is collected data, wherein the collected data includes an indication of whether an automatic teller machine within a plurality of automatic teller machines is operational;

comparing means for comparing the collected data with current data regarding the facilities;

identifying means for identifying changes present between the collected data and the current data;

updating means for updating the current data using the changes; and location of a facility, for sending a response to the mobile computing system based on the current data and the request.

17. The processing data processing system of claim 16, wherein receiving data includes receiving status information from each of the plurality of automatic teller machines.

18. The data processing system of claim 16, wherein sending a response comprises:

first identifying means for identifying the driver originating the request;

obtaining means, responsive to identifying the driver, for obtaining driver preferences regarding automatic teller machine for the driver; and     second identifying means for identifying a automatic teller machine from the plurality of automatic teller machines using the driver preferences and the current data.

19. The data processing system of claim 16, wherein the mobile computing system is located in an automobile.

20. The data processing system of claim 16, wherein the current data is stored in a storage device.

21. A computer program product in a computer readable medium for locating a facility from a plurality of facilities, the computer program product comprising;

first instructions for receiving data from the plurality of facilities in which the plurality of facilities is a plurality of automatic teller machines, wherein the data is collected data and wherein the collected data includes an availability of cash at each of the plurality of automatic teller machines;

second instructions for comparing the collected data with current data regarding facilities;

third instructions for identifying changes present between the collected data and the current data;

fourth instructions for updating the current data using the changes; and     fifth instructions, responsive to a request from a mobile computing system for a location of a facility, for sending a response to the mobile computing system based on current data and the request.

22. A computer program product in a computer readable medium for locating a facility from a plurality of facilities, the computer program product comprising:

first instructions for receiving data from the plurality of facilities in which the plurality of facilities is a plurality of automatic teller machines, wherein the data is collected data and wherein the collected data includes an indication of whether an automatic teller machine within the plurality of automatic teller machines is operational;

second instructions for comparing the collected data with current data regarding facilities;

third instructions for identifying changes present between the collected data and the current data;

fourth instructions for updating the current data using the changes; and fifth instructions, responsive to a request from a mobile computing system for a location of a facility, for sending a response to the mobile computing system based on current data and the request.

23. A data processing system for locating a facility from a plurality of facilities, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive data from the plurality of facilities in which the plurality of facilities is a plurality of automatic teller machines, wherein the data is collected data and wherein the collected data includes an availability of cash at each of the plurality of automatic teller machines; compare the collected data with current data regarding facilities; identify changes present between the collected data and the current data; update the current data using the changes; and send a response to a mobile computing system based on current data and in response to a request from the mobile computing system for a location of a facility.

24. A data processing system for locating a facility from a plurality of facilities, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive data from the plurality of facilities in which the plurality of facilities is a plurality of automatic teller machines, wherein the data is collected data and wherein the collected data includes an indication of whether an automatic teller machine within the plurality of automatic teller machines is operational; compare the collected data with current data regarding facilities; identify changes present between the collected data and the current data; update the current data using the changes; and send a response to a mobile computing system based on current data and in response to a request from the mobile computing system for a location of a facility.

* * * * *

UNITED STATES PATENT AND TRADEMARK OFFICE
CERTIFICATE OF CORRECTION

PATENT NO. : 6,505,165 B1  Page 1 of 1
APPLICATION NO. : 09/239331
DATED : January 7, 2003
INVENTOR(S) : Berstis et al.

It is certified that error appears in the above-identified patent and that said Letters Patent is hereby corrected as shown below:

Col. 11, line 42: delete "The" and insert --A--.

Col. 11, line 58: after "for a", delete "lacation" and insert --location--.

Col. 12, line 27: after "changes; and", begin a new paragraph.

Col. 12, line 27: before "location" insert --sending means, responsive to a request from a mobile computing system for a--.

Signed and Sealed this

Thirtieth Day of January, 2007

JON W. DUDAS
*Director of the United States Patent and Trademark Office*